Patented Apr. 14, 1936

2,037,442

UNITED STATES PATENT OFFICE 2,037,442

PRODUCING ORGANIC COMPOUNDS CAPABLE OF SPLITTING OFF HALOGEN

Heinrich Ulrich and Paul Koerding, Ludwigshafen-on-the-Rhine, Germany, assignors to I. G. Farbenindustrie Aktiengesellschaft, Frankfort-on-the-Main, Germany No Drawing. Application August 22, 1934, Serial No. 740,970. In Germany August 29, 1933

11 Claims. (Cl. 260—99.12)

The present invention relates to organic compounds capable of splitting off halogen and a process of producing same.

It is already known that compounds halogenated on the nitrogen atom can be obtained by the action of halogen, for example chlorine or bromine, on aromatic sulphonamides. The said compounds split off halogen comparatively readily, for which reason they may be employed with advantage for a great variety of purposes, in particular as bleaching agents in the textile industry.

We have now found that organic compounds which also are capable of splitting off halogen readily are obtained by causing halogens, such as, for example, bromine or, preferably chlorine, or substances which split off halogen (such as hypochlorites when working is effected in aqueous media) to react with amines containing directly attached to the nitrogen atom at least one hydrogen atom and one alkylene group which bears a sulphur-containing radicle selected from the class consisting of the sulphuric ester and sulphonic acid groups. The said amines are primary or secondary amines in which an alkyl group is attached to nitrogen which alkylene group bears a group —SO$_3$H or —O—SO$_3$H. The reaction is carried out in the presence of basic substances. Usually at least such amounts of the basic substances are employed as are sufficient for neutralizing the halogen hydride split off. Preferably the reaction is carried out between about 0° and about 50° C., although somewhat lower or higher temperatures may occasionally be allowable. Usually the reaction is accompanied by a development of heat; as soon as the reaction is completed the development of heat ceases.

As initial materials may be mentioned, for example, the sulphuric esters of monoethanol amine, diethanol amine, propanol amine, butanolamine, butylethanol amine, propylbutanol amine, cetylethanol amine, octodecylpropanol amine, cyclohexylpropanol amine, phenylethanol amine, tolylbutanol amine and naphthylpropanol amine. The true sulphonic acids corresponding to the said sulphuric esters may also be employed, as for example aminoethane sulphonic acid, N-methyl-, N-propyl-, N-butyl-, N-octyl- and N-cetyl-aminoethane sulphonic acids, N-phenylaminopropane sulphonic acid, N-naphthylaminobutane sulphonic acid or other aliphatic amino sulphonic acids of high molecular weight. Instead of free sulphuric esters or sulphonic acids, their salts may also be employed.

The reaction may be carried out in different ways. It is preferable to suspend the dry initial material in solvents which are not attacked by halogen under the working conditions employed, such as, for example, in glacial acetic acid, chloroform or carbon tetrachloride. The reaction may also be carried out in aqueous media. For the purpose of combining with the hydrogen halides set free during the reaction, basic substances are added, such as, for example, powdered calcium carbonate, zinc oxide or sodium acetate. It is, of course, preferable to employ such basic substances as do not react with the solvents; for example if acetic acid is used as solvent, preferably a basic acetate such as sodium acetate is added as the basic substance.

The halogen still present in the reacted mixture is removed for example by leading in air, nitrogen or the like, the deposited reaction product containing halogen being recovered, for example by filtration. When working in aqueous solution, the reaction product is recovered by evaporation at moderately elevated temperature, preferably under reduced pressure.

The nature of the products obtainable according to the present invention is not exactly known; presumably, when compounds of the type H$_2$=N—R—X (wherein R is an alkylene radicle and X an —O—SO$_3$H or —SO$_3$H radicle) are employed, the final products correspond to the general formula

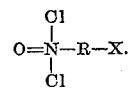

The products obtainable according to this invention are relatively stable in the dry state and readily soluble in water and organic solvents. When heated in aqueous solution they split off halogen; the speed of splitting off halogen usually increases with higher temperatures and with increasing concentration of the aqueous solutions. They may be employed with advantage as bleaching agents in the textile, leather, paper and like industries.

The following examples will further illustrate

Example 1

150 parts of monoethanol amine sulphuric ester are suspended in 600 parts of glacial acetic acid and 90 parts of anhydrous sodium acetate are introduced into the suspension. Chlorine is led into the suspension while stirring vigorously. The action of the chlorine proceeds with spontaneous evolution of heat; it is preferable to ensure, by cooling, that the temperature does not exceed 40° C. When the reaction is completed, the excess of chlorine is removed by leading in air and the deposited reaction product, which contains sodium chloride, is filtered off by suction from the glacial acetic acid. The crude product is freed from glacial acetic acid by washing with cold alcohol and then dried at moderate temperature. The chlorinated aminoethanol sulphuric ester is thus obtained in a yield of about 85 per cent of the theoretical amount; it can be purified by crystallization from alcohol. It crystallizes in the form of fine colorless leaflets and, contrasted with the initial material, is readily soluble in warm alcohol. The halogen is split off from the product in boiling water. The substance has a slight odor of chlorine when in the dry state. Besides two active chlorine atoms the product contains obviously an active oxygen atom.

By employing aminoethane sulphonic acid (taurine) instead of monoethanolamine sulphuric ester, a product having similar properties is obtained.

Example 2

150 parts of aminoisopropanol sulphuric ester are dissolved or suspended in 220 parts of water and 110 parts of calcium carbonate powder are added. Chlorine is introduced into the liquid while stirring intensely whereby the temperature rises to about 40° C. As soon as the temperature begins to drop the mass is warmed to about 50° C., the remaining calcium carbonate is filtered off by suction and the solution obtained is evaporated in vacuo at 40° C. The chlorinated aminoisopropanol sulphuric ester precipitates as a whitish yellow crystalline mass; it is freed from adhering mother liquor by filtering with suction and dried in vacuo. The product is obtained in a yield of about 75 percent of the theoretical amount. It may be purified by recrystallization from hot ethylalcohol.

What we claim is:—

1. The process of producing nitrogenous organic compounds capable of splitting off halogen when in contact with water, which comprises causing halogen to react with an amine containing directly attached to the nitrogen atom at least one hydrogen atom and one alkylene group which bears a sulphur-containing radicle selected from the class consisting of the sulphuric ester and sulphonic acid groups.

2. The process of producing nitrogenous organic compounds capable of splitting off chlorine when in contact with water, which comprises causing chlorine to react with an amine containing directly attached to the nitrogen atom at least one hydrogen atom and one alkylene group which bears a sulphur-containing radicle selected from the class consisting of the sulphuric ester and sulphonic acid groups.

3. The process of producing nitrogenous organic compounds capable of splitting off chlorine when in contact with water, which comprises causing chlorine to react with an amine containing directly attached to the nitrogen atom at least one hydrogen atom and one alkylene group which bears a sulphur-containing radicle selected from the class consisting of the sulphuric ester and sulphonic acid groups in the presence of a basic substance.

4. The process of producing nitrogenous organic compounds capable of splitting off chlorine when in contact with water, which comprises causing chlorine to react with an amine containing directly attached to the nitrogen atom at least one hydrogen atom and one alkylene group which bears a sulphur-containing radicle selected from the class consisting of the sulphuric ester and sulphonic acid groups in the presence of a diluent.

5. The process of producing nitrogenous organic compounds capable of splitting off chlorine when in contact with water, which comprises causing chlorine to react with an amine containing directly attached to the nitrogen atom at least one hydrogen atom and one alkylene group which bears a sulphur-containing radicle selected from the class consisting of the sulphuric ester and sulphonic acid groups in the presence of a diluent and a basic substance.

6. The process of producing nitrogenous organic compounds capable of splitting off chlorine when in contact with water, which comprises causing chlorine to react with an amine containing directly attached to the nitrogen atom at least one hydrogen atom and one alkylene group which bears a sulphur-containing radicle selected from the class consisting of the sulphuric ester and sulphonic acid groups at between about 0° and about 50° C. in the presence of a basic substance.

7. Nitrogenous organic compounds capable of splitting off halogen when in contact with water and obtainable by causing halogen to react with an amine containing directly attached to the nitrogen atom at least one hydrogen atom and one alkylene group which bears a sulphur-containing radicle selected from the class consisting of the sulphuric ester and sulphonic acid groups.

8. Nitrogenous organic compounds capable of splitting off halogen when in contact with water, containing halogen atoms and oxygen attached to the nitrogen atom, probably corresponding to the general formula:

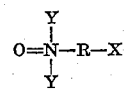

wherein Y represents a halogen atom, R an alkylene radical and X an —O—SO$_3$H or a —SO$_3$H radical, and obtainable by halogenating a compound corresponding to the following general formula: H$_2$=N—R—X, wherein R and X have the meaning designated above.

9. Nitrogenous organic compounds capable of splitting off chlorine when in contact with water, containing chlorine atoms and oxygen attached to the nitrogen atom, probably corresponding to the general formula:

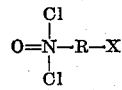

wherein R represents an alkylene radical and X an —O—SO$_3$H or a —SO$_3$H radical, and obtainable by chlorinating a compound corresponding to the following general formula: H₂=N—R—X, wherein R and X have the same meaning designated above.

10. Nitrogenous organic compounds capable of splitting off chlorine when in contact with water, containing chlorine atoms and oxygen attached to the nitrogen atom, probably corresponding to the formula:

$$\underset{\underset{Cl}{|}}{\overset{Cl}{\underset{|}{O=N}}}-C_2H_4-O-SO_3H$$

and obtainable by chlorinating monoethanol amine sulphuric ester.

11. Nitrogenous organic compounds capable of splitting off chlorine when in contact with water, containing chlorine atoms and oxygen attached to the nitrogen atom, probably corresponding to the formula:

$$\underset{\underset{Cl}{|}}{\overset{Cl}{\underset{|}{O=N}}}-CH_2-\underset{\underset{O-SO_3H}{|}}{CH}-CH_3$$

and obtainable by chlorinating amino-isopropanol sulphuric ester.

HEINRICH ULRICH.
PAUL KOERDING.